United States Patent
Brahmavar

(10) Patent No.: US 7,882,223 B2
(45) Date of Patent: Feb. 1, 2011

(54) SYSTEM AND METHOD FOR SAVING DUMP DATA OF A CLIENT IN A NETWORK

(75) Inventor: Deepak Brahmavar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 12/204,490

(22) Filed: Sep. 4, 2008

(65) Prior Publication Data

US 2009/0063651 A1 Mar. 5, 2009

(30) Foreign Application Priority Data

Sep. 5, 2007 (IN) .................. 1997/CHE/2007

(51) Int. Cl.
*G06F 15/173* (2006.01)
(52) U.S. Cl. .................. 709/224; 709/212; 714/48; 711/170
(58) Field of Classification Search ......... 709/220–224, 709/212–216; 714/38; 711/101
See application file for complete search history.

(56) References Cited

U.S. PATENT DOCUMENTS

| | | | |
|---|---|---|---|
| 6,430,707 B1* | 8/2002 | Matthews et al. ............. 714/37 |
| 6,662,307 B1* | 12/2003 | Sipple et al. .................... 714/2 |
| 2002/0078404 A1* | 6/2002 | Vachon et al. ................ 714/38 |
| 2005/0120162 A1* | 6/2005 | Sivaram ..................... 711/101 |
| 2005/0228960 A1* | 10/2005 | Francis et al. ............... 711/165 |
| 2007/0033281 A1* | 2/2007 | Hwang et al. ............... 709/224 |
| 2007/0186279 A1* | 8/2007 | Zimmer et al. ................. 726/9 |
| 2008/0126879 A1* | 5/2008 | Tiwari et al. ................. 714/46 |
| 2009/0042640 A1* | 2/2009 | Gagner et al. ................ 463/24 |

OTHER PUBLICATIONS

Newhall, Tia et al., "Nswap: A Network Swapping Module for Linux Clusters", *Proceedings of Euro-Par'03 International Conference on Parallel and Distributed Computing, Klagenfurt, Austria*, Lecture Notes in Computer Science, vol. 2790,(Aug. 2003).

* cited by examiner

*Primary Examiner*—Salad Abdullahi

(57) ABSTRACT

A system and method for saving memory dump data from an operating system of a client in a network. The method includes configuring the client to allocate client system memory according to system memory classifications, configuring the client to transfer dump data to at least one dump server, saving said dump data periodically during client system run-time based on the system memory classifications, and saving dump data in the event of a client system crash to at least complement the dump data sent periodically during client system run-time.

20 Claims, 5 Drawing Sheets

SYSTEM AND METHOD FOR SAVING DUMP DATA OF A CLIENT IN A NETWORK

RELATED APPLICATIONS

This patent application claims priority to Indian patent application serial number 1997/CHE/2007, having title "System and Method for Saving Dump Data of a Client in a Network", filed on 5 Sep. 2007 in India (IN), commonly assigned herewith, and hereby incorporated by reference.

BACKGROUND OF THE INVENTION

A client is typically configured, by a user, to save a dump of client system memory in the event of a client system crash. This is generally achieved by saving client system memory dump data before the client is rebooted, following a crash, to either system swap or dedicated local dump devices. If a system swap is utilized to save dump data, any data saved onto the swap will be overwritten when the operating system reboots and reuses the swap. In order to save memory dump data from the system swap to a dedicated dump device or a preconfigured dump server, a further process must be performed during system reboot and this contributes further to the time taken to reboot and thus the total down-time experienced.

Also, typical clients now support a greater number of features and extensions which have increased both the size of the memory dump data footprint and the likelihood of a client system crash. As a result, the total client system down-time during a crash has increased. This is particularly undesirable in situations where critical data is handled such as online shopping servers, financial data processing servers and online database servers.

Attempts have been made to reduce total down-time and the time taken to save memory dump data during reboot. These include saving the memory dump data across a network either by transferring directly to a dedicated dump server or onto a Network File System (NFS) exported dump device. However, problems such as reliability and availability exist with saving to a single server. Also, the time taken to transfer the information saved as part of the dump, is still a significant portion of the total down-time.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There is provided a client for saving memory dump data from an operating system of a client in a network.

In one embodiment, a client in a network having at least one dump server, the client having system memory allocated according to system memory classifications, the client being arranged to transfer dump data periodically to the at least one dump server during client system run-time and is determined based on the system memory classifications, and transfer dump data to the at least one dump server to at least complement the dump data sent periodically during client system run-time in the event of a client system crash.

There will also be provided a system for saving dump data from an operating system of a client in a network having at least one dump server, the client having system memory allocated according to system memory classifications, and the client being arranged to save dump data periodically to the at least one dump server during client system run-time and is determined based on the system memory classifications, and save dump data to the at least one dump server to at least complement the dump data sent periodically during client system run-time in the event of a client system crash.

There will also be provided a method for saving dump data from an operating system of at least one client in a network, including configuring the client to allocate client system memory according to system memory classifications, configuring the client to transfer dump data to at least one dump server, saving said dump data periodically during client system run-time based on the system memory classifications, and saving dump data in the event of a client system crash to at least complement the dump data sent periodically during client system run-time.

Figure 1:
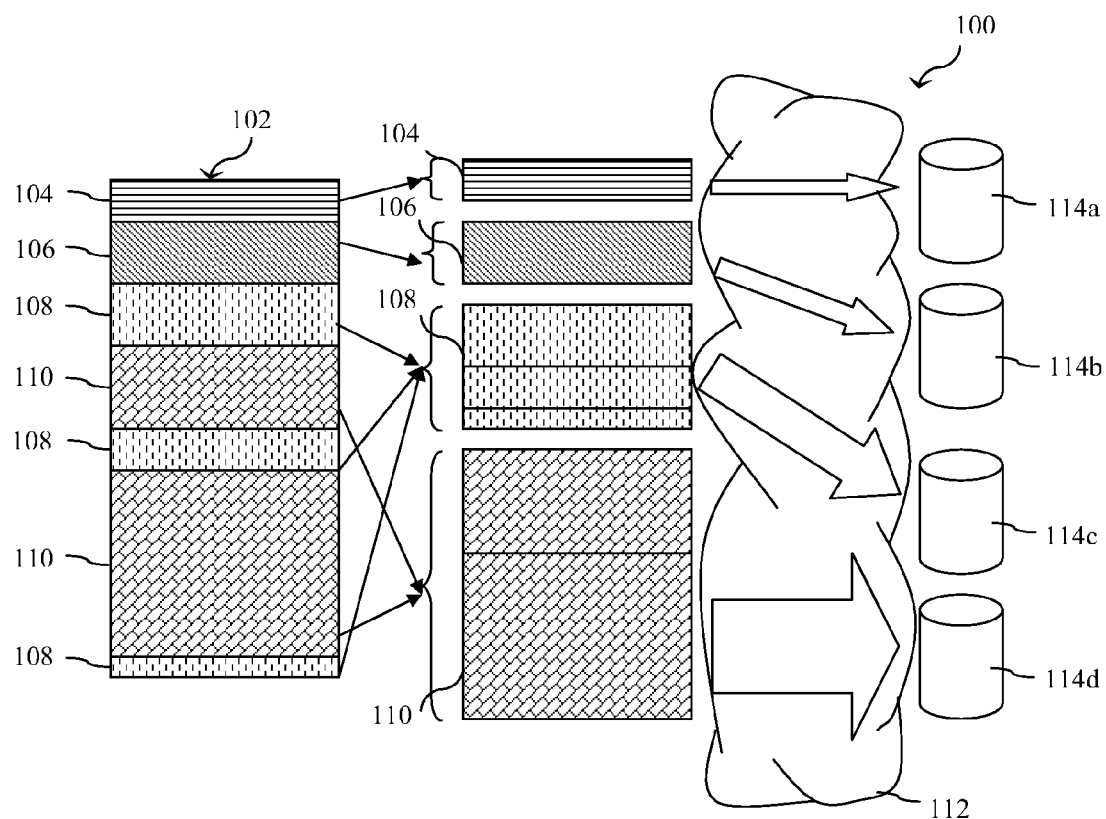
FIG. 1 is a schematic view of a client in a network having at least one dump server for saving dump data according to an embodiment of the present invention.

FIG. 1 is a schematic view of a client in a network 100 according to an embodiment of the present invention. A client is configured to save system memory as dump data in the event of an operating system crash dump and periodically during client operating system run-time. The dump data transferred to at least one dump server in the event of a client system crash is transferred to complement the data sent periodically. Complementary data is data not already transferred. Persons skilled in the art will appreciate that this includes data that had already been transferred, but was subsequently modified. Thus, it is not necessary to retransfer data that has already been transferred and has not been modified since the transfer.

System memory is classified according to system memory classifications based on operating system usage. Shown in FIG. 1 is a client in a network whereby the client system memory 102 comprises allocated client system memory usage classes 104, 106, 108, and 110. In this figure only one client is shown, however, it is envisaged multiple clients can be connected to the network 112.

Dump data is transferred across the network 112 to at least one dump server 114. In this example, there are a plurality of dump servers 114a, 114b, 114c, and 114d configured to receive dump data as allocated client system memory 104, 106, 108, and 110, grouped in terms of these allocations. The allocated and grouped memory dump data is distributed amongst the network dump servers and the distribution can be configurable with respect to the importance of the system memory classification classes to subsequent dump analysis.

Figure 2:
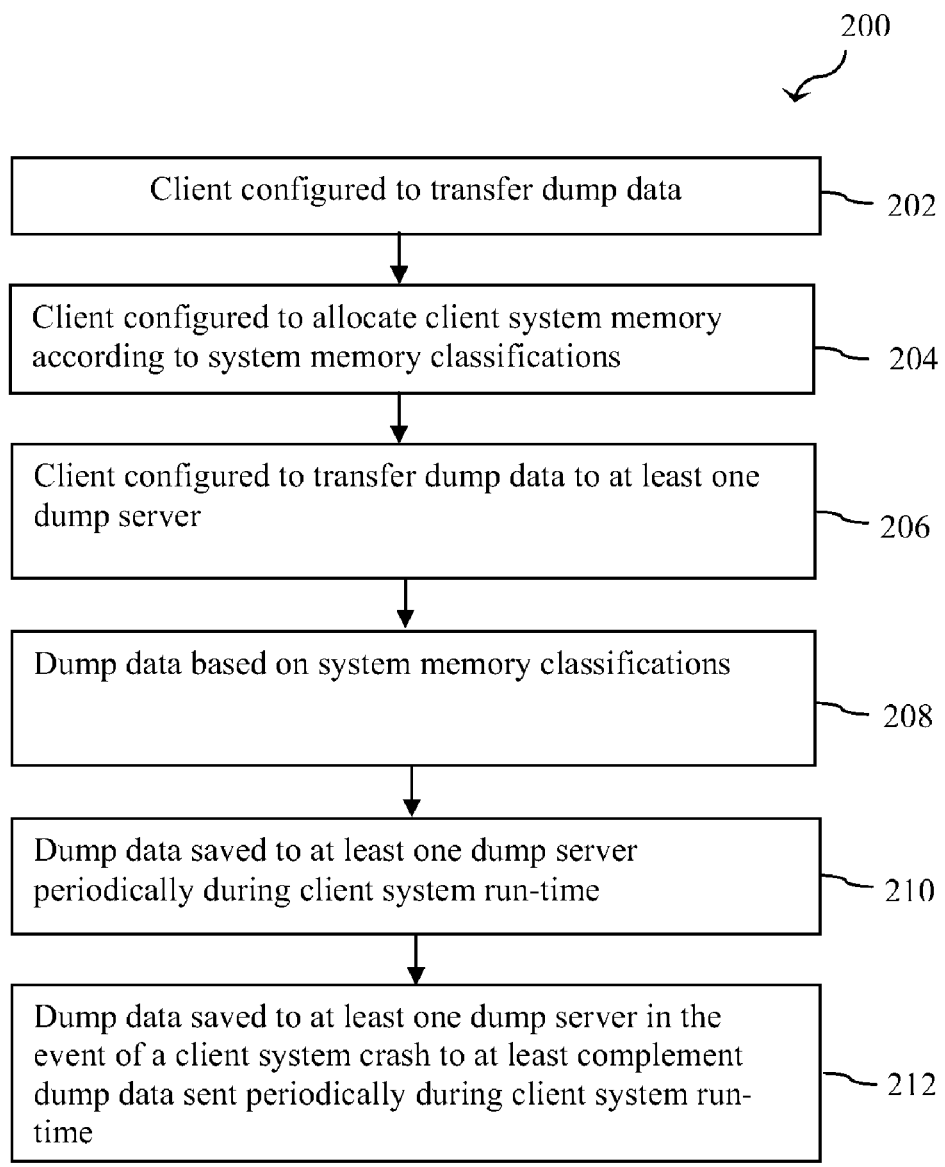
FIG. 2 is a flow chart of a method for saving dump data of a client in a network according to an embodiment of the present invention.

FIG. 2 is a flow chart of a method for saving dump data from an operating system of a client in a network 200, according to an embodiment of the present invention, showing the step of at least one client being configured to transfer memory dump data 202. The client is configured to send memory dump data both periodically during client system run-time and in the event of the client system crashing.

The client is also configured to allocate client system memory 204 according to operating system memory classification classes, whereby system memory data found in the same system memory classes is grouped together by the client and sent to at least one dump server 206 across the network as dump data. The client also can be configured to determine what dump data is sent to at least one dump server 208. The determination of what dump data is sent periodically 210 during client system run-time and what is sent in the event of client system crash 212 is based on the importance of these classes to dump analysis. The dump data sent in the event of a client system crash is complementary data to dump data sent periodically.

Figure 3:
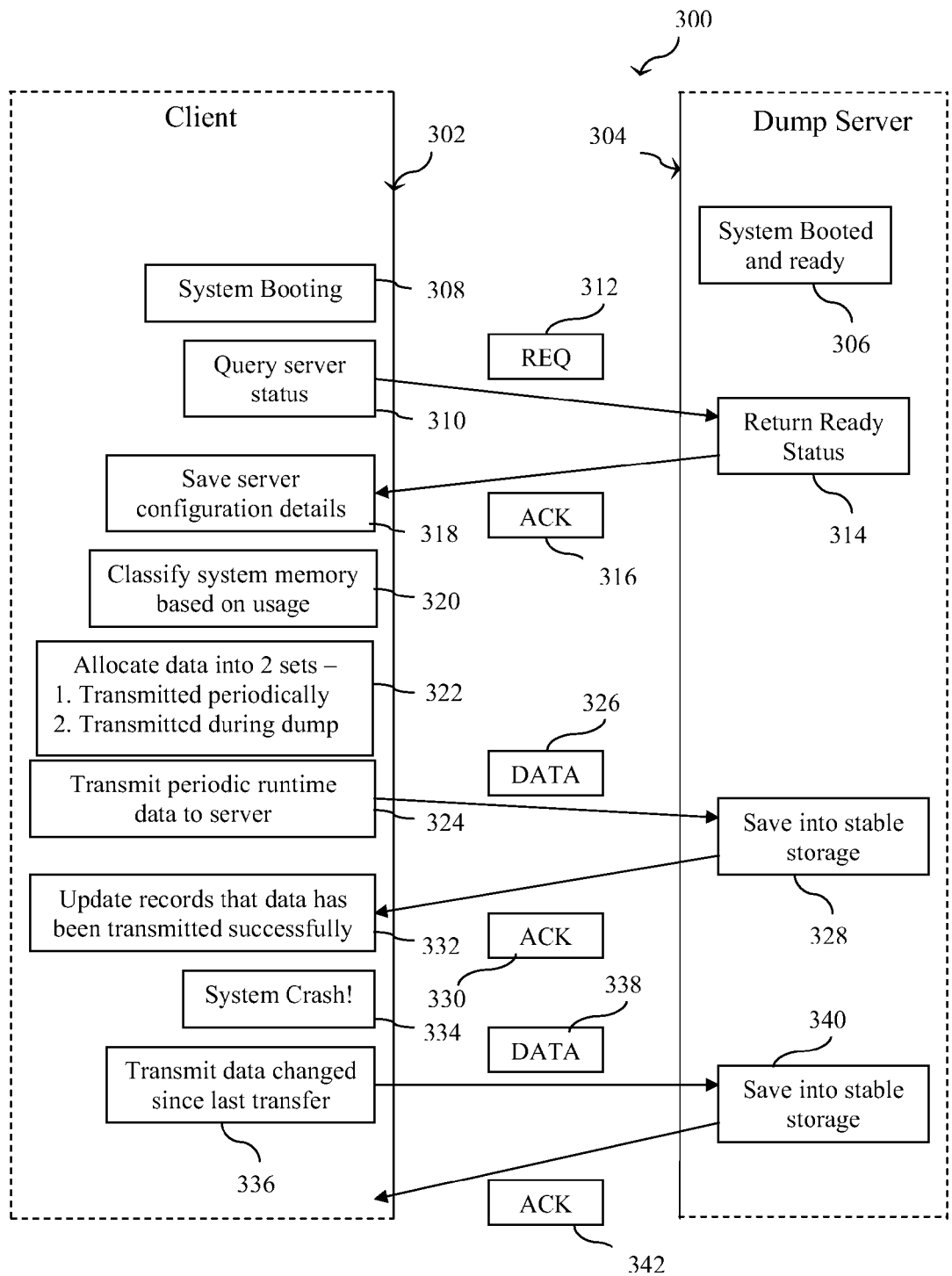
FIG. 3 is a flow chart of the method for saving dump data of FIG. 2, including information sent over the network.

FIG. 3 is a flow chart of a method for saving memory dump data in a network 300 according to an embodiment of the present invention, including information sent over the network. Shown in this figure is the sequence of saving memory dump data from a dump client 302 and transferring it to at least one network dump server 304. FIG. 3 is an example of the sequence and illustrates the sequence for one client and one of the dump servers only. It is envisaged that there is at least one client employed by the system.

The sequence is initiated when both the dump server operating system is booted and in the ready state 306 and the client operating system is booted and ready 308. The client operating system generates 310 a query server status request and a request 312 is sent across the network. The dump server is required to be in the ready state 314 and an acknowledgement 316 is returned across the network as well as any server configuration details required by the client. These configuration details include the network protocol address of the dump servers and the type of data accepted by each of them. This information is saved and used to configure the client 318.

The dump client is configured to classify system memory to be dumped, in the event of a crash and during client system run-time, as shown in step 320. Memory is classified by the operating system into various classes based on usage classes such as: kernel code, read-only kernel data, read-write kernel data, dynamically allocated kernel data, driver code, dynamically loaded driver code, read-only driver data, read-write driver data, dynamically allocated driver data, user code, user data, unused memory, previously used but subsequently freed up memory, etc. Depending on the degree of encapsulation and separation of system memory, these classifications can be further sub divided into categories such as process management code, memory management code, system code, networking code, etc. Persons skilled in the art will appreciate that other classification schemes can be used.

In the embodiment shown in FIG. 3, system memory is classified based on usage 320 either explicitly by the user or by the client operating system. For example, kernel memory contents are more valuable than user memory contents for debugging purposes in most cases. As a result, client system memory data need not be dumped, thus, saving time with regards to total information sent across the network and the size of the data transferred in a dump.

It is an advantage of the embodiment shown in FIG. 3 that only one or some memory classification classes containing the fault are required to be dumped even when the fault exists across multiple classes.

The information contained in a dump also includes dump meta-data in addition to memory dump data. Dump meta-data contains information about the dump such as the size of the dump, classification of dump data, and the dump address map which includes details about the individual portions of the dump data as well as details of the dump servers where the memory dump data is stored.

The client 302 is configured to send dump data to a dump server 304 both periodically during client system run-time and during a dump following a system crash. Determining what data is transferred periodically and in the event of system crash is dependent on the computing requirements of the client and the network bandwidth. The frequency of memory dump data periodic transmissions can be configured to best suit the user's immediate needs. For example, the user can decrease the frequency of periodic transmissions during periods of heavy network traffic. The allocated bandwidth for dump traffic can also be reduced by the user thereby increasing the capacity across a network for regular network traffic.

The client operating system determines, in step 322, memory dump data to be sent across the network as either data transmitted periodically or data transmitted during a system crash dump. Information modified regularly during system activity is sent on a periodic basis 324, with the frequency of information sent and the affected memory classes being configurable. Therefore, there are two sets of independently configurable memory classifications to reduce the amount of data sent across the network in the event of a system crash, thus, reducing client system down-time. Also, if the operating system of the client supports a network swap, information relevant to dump analysis can be transferred to network swap servers forming distributed dump servers. This eliminates the need to transfer this information separately to the dump servers in the event of a system crash and results in further reducing client system down-time.

The operating system on the client maintains an association table between a set of events occurring during operating system run-time and the memory which can be modified as a result of these events. For example, if the event of hot-patching is conducted, a kernel node is modified. The table contains a record of the events that have occurred since the last periodic transfer of dump data and is used to determine what information is sent to the dump servers during system run-time. The table also details potential points of system failures.

The association table can be coded and configured by the operating system developer or be determined as a result of a series of instrumented test sequences. The test sequences involve registering a series of event and determining the exact changes that have occurred based on the proposed memory classification classes that could have been modified. Only the classes with changed data are identified and this information is used to select data to be transferred across the network 326.

The corresponding dump server 304 saves this dump data 328 and sends an acknowledgement 330 back to the client to update the record of information sent as an acknowledgement flag, in the association table within the client 332. Dump meta-data can be updated continually during system run-time and transferred along with the periodically sent dump data to reduce dump transfer time. Alternatively, if bandwidth usage is a concern, the meta-data can be restricted to only be sent during system crash dump. As meta-data is critical to the analysis of the generated dump data, the dump meta-data can be saved on at least one dump server with redundancy provisions. Methods of redundancy envisaged are redundant hardware, implementing hardware, software mirroring and striping. Other critical dump data can be stored with similar redundancy provisions The configuration characteristics of the server such as size of storage, system memory, network bandwidth and high availability features, is chosen on the basis of relevance of data for post crash dump analysis. Also envisaged is the use of heterogeneous server configurations.

In the event of a system crash 334, the operating system determines the system memory data to be actually dumped 336 based on information on what system memory has been modified since the last transfer. The operating system then utilizes the configured interfaces to transmit the dump data 338 according to the system memory classification allocation to the configured associated dump server.

The transmitted data is saved in the corresponding network dump server 340 and acknowledged 342 back to the client so that the client can update its record of the last information sent.

Figure 4:
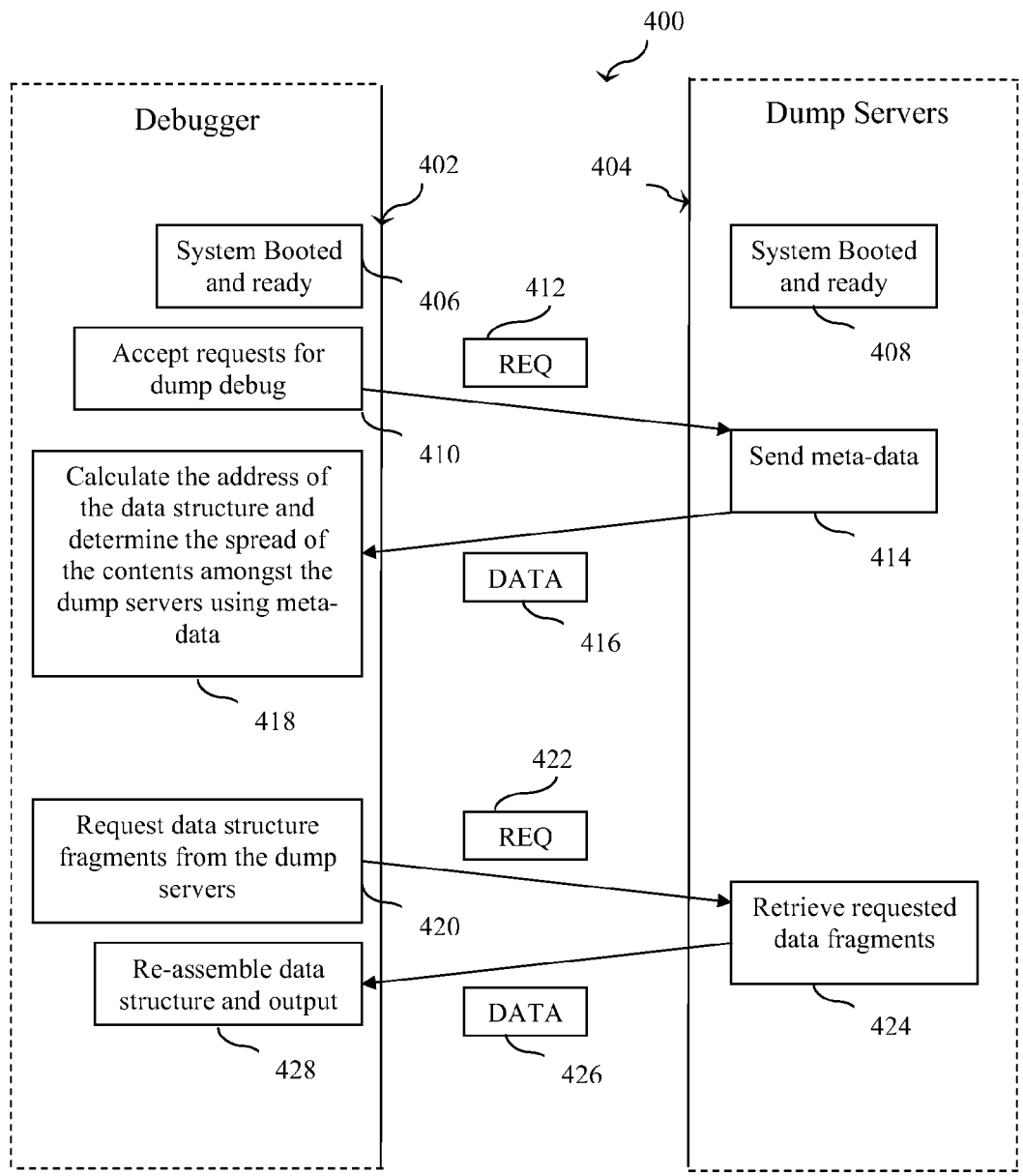
FIG. 4 is a flow chart of the method for retrieving dump data saved according to the flow chart of FIG. 3.

FIG. 4 is a flow chart of the method retrieving memory dump data saved according to the flowchart in FIG. 3.

FIG. 4 illustrates the method of retrieving and debugging/analyzing, the memory dump data 400. Shown is the client in a debugging state 402 and the dump servers 404, where the client is attempting to retrieve sent memory dump data stored amongst a plurality of dump servers. Both the debugger system and the dump servers are in a ready state 406 and 408, for the debugger to accept a request to debug. It is envisaged that the client can also function as a debugger system.

The debugger system, in the debugging state, sends a request 412 to the dump server containing the required meta-data 414. The meta-data is sent across the network 416 and is used to determine the spread and address of the memory dump data and in turn the data structure contents existing prior to its output across the network. Also determined is the size and relative offsets of the dump data to be retrieved from each server.

Memory dump meta-data is typically stored on a single network server however it is envisaged that it could be spread amongst multiple servers. In this case, a single server would be required to maintain information regarding the spread of meta-data amongst the servers for the debugger to access initially.

The debugger transmits requests 422 to each of the dump servers for the portions of data and the servers receive the request and retrieve the requested data fragments 424 and send the retrieved data 426 across the network. The debugger then reassembles the received information 428 and recreates the data structure prior to output.

The quantity of storage of dump data on each server is determined on the basis of the estimated size of the memory dump data being saved and the number of dumps to be stored. Alternatively, the size can be tuned based on a series of test runs to determine the size limits of the information required to be saved on the server. Network bandwidth and memory requirements for servers are also based on the typical size of dump data saved in the system and the number of dumps simultaneously supported. The higher the number of simultaneous dumps supported, the greater the memory and bandwidth requirements.

Figure 5:
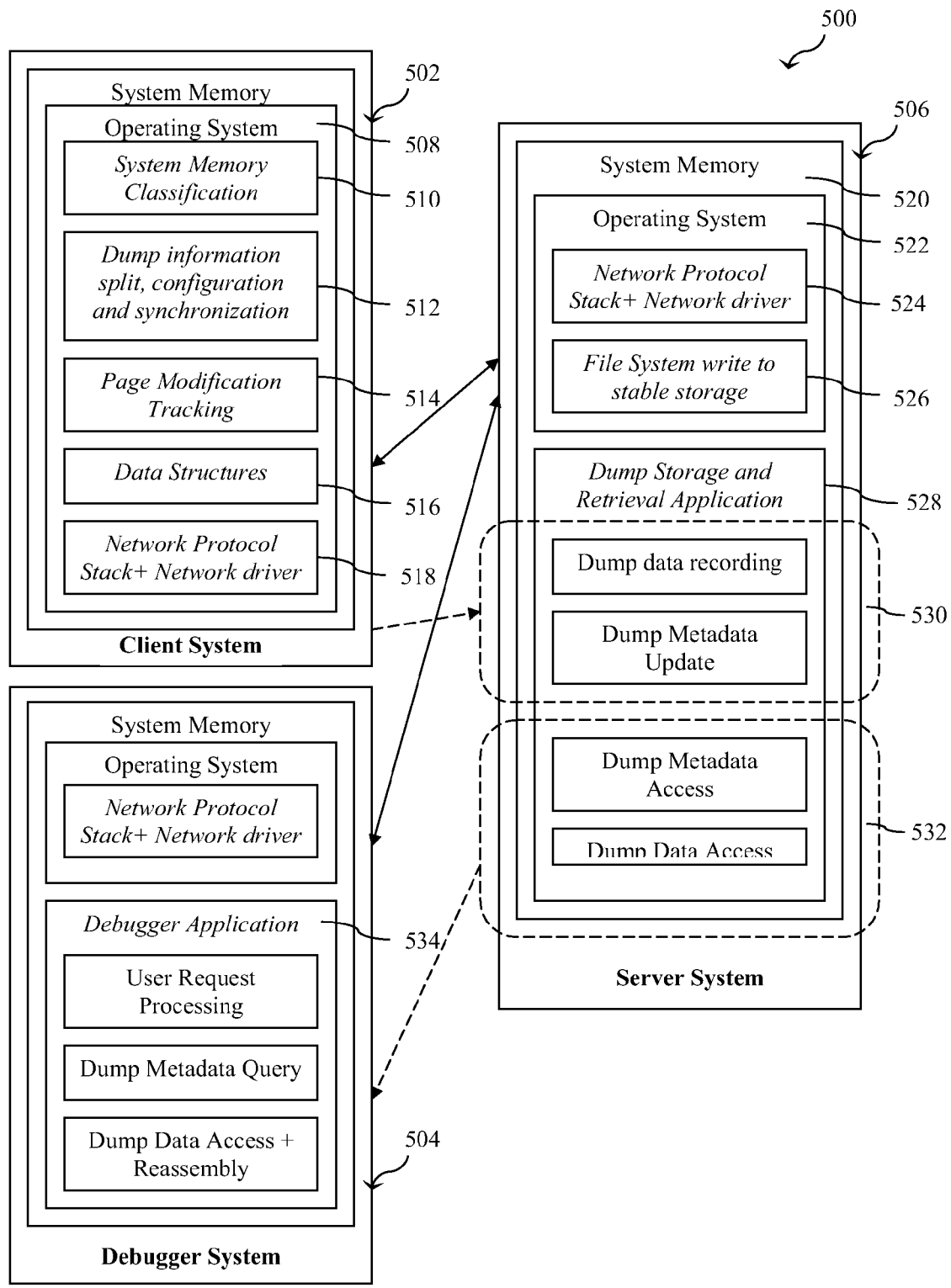
FIG. 5 is a schematic view of a system for saving memory dump data, including the retrieval of dump data.

FIG. 5 illustrates a schematic view of the system for saving memory dump data of FIG. 1, including the retrieval of memory dump data 500. Shown in FIG. 5 is a client 502, a client debugger 504 and a server system 506. The client comprises an operating system 508 configured to split system memory into system memory classification classes 510 based on their usage by the operating system. Data to be dumped is then determined 512 based on the allocation of system memory into these classes.

The operating system further configures and synchronize the memory dump data in order to distribute it to the desired network server, including any corresponding meta-data. Dump data is also configured as to whether it is to be sent periodically during system run-time or in the event of system crash. Also, configurable is the number of classes of data sent to the servers, which classes are to be sent during system run-time based on relevance to dump analysis, and the existence of any special event. These special events are registered with the operating system and trigger memory dump data to be transferred to the servers immediately rather than during system run-time.

In this example, the operating system divides system memory contents into fixed sized blocks called pages, based on the allocation of client system memory into memory classification classes. The operating system maintains a page directory table which updates a modification flag when the corresponding page is modified 514. The operating system then refers to this table to determine what data is required to be transferred across the network. The modified since last transfer data structure 516 is then distributed and transferred as memory dump data over the network employing a low level network protocol layer 518.

The network server 506 also has system memory 520, an operating system 522, the necessary network drivers 524, and a file system 526 to reliably save the memory dump data. A dump storage and retrieval application 528 is run on the dump server system including memory dump data recording and dump meta-data updating 530 capabilities. Also, in this example the network server 506 contains dump meta-data accessing and sending 532 capabilities.

The debugger system 504 is a client operating in debugger mode, following a request from a user or computer program, and includes the debugger application 534, where the routine for processing user requests, dump meta-data requests, dump data retrieval and data structure reassembly occurs.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit and scope of the invention. It is therefore desired that the present embodiments be considered in all respects as illustrative and not restrictive. Accordingly, the present invention is not intended to be limited to the embodiments described above but it to be accorded the widest scope consistent with the principles and novel features disclosed herein.

The invention claimed is:

1. A client in a network having at least one dump server, the client comprising system memory allocated according to system memory classifications, the client being arranged to:
    transfer pre-crash dump data periodically to the at least one dump server during client system run-time prior to an event of a client system crash wherein said client is configurable to vary the frequency of the pre-crash dump data sent periodically during client system run-time; and
    transfer crash dump data to the at least one dump server in the event of the client system crash to at least complement the pre-crash dump data, wherein the crash dump data comprises modified portions of the pre-crash dump data.

2. A client as claimed in claim 1, wherein the crash dump data transferred to at least one dump server in the event of client system crash is complementary data not previously transferred.

3. A client as claimed in claim 1, wherein the network comprises a plurality of dump servers.

4. A client as claimed in claim 3, wherein the pre-crash dump data transferred periodically and the crash dump data transferred in the event of client system crash are transferred and distributed amongst said dump servers according to the allocated system memory classifications.

5. A client as claimed in claim 1, wherein an operating system of the client comprises pages based on the allocation of system memory according to system memory classifications, and the operating system maintains a page directory table for said pages including a modification flag configured to change when the corresponding page is modified.

6. A client as claimed in claim 5, wherein said modification flag is further configured to be reset when the corresponding page is transferred as pre-crash dump data to the at least one dump server.

7. A client as in claim 1, wherein said client is configurable to vary the quantity of the pre-crash dump data transferred periodically during client system run-time and the crash dump data transferred in the event of client system crash.

8. A client as in claim 1, wherein said client is configurable to assign priority to the system memory classifications based on importance to dump data analysis.

9. A client as in claim 1, wherein at least one system memory classification is not sent as dump data.

10. A client as in claim 1, wherein said pre-crash dump data includes dump meta-data having size and system memory classification information of said pre-crash dump data, and information containing the address of said pre-crash dump data located in at least one dump server.

11. A client as in claim 1, wherein said client further includes a debugger configured to retrieve dump meta-data from at least one dump server to enable reassembly of said pre-crash dump data and crash dump data into a client system data structure.

12. A client as in claim 11, wherein said debugger is configured to retrieve said dump meta-data from at least one dump server to determine a dump data location on said dump server and to send a request to said dump server to retrieve said pre-crash dump data and crash dump data to reassemble said client system data structure.

13. A system for saving pre-crash dump data and crash dump data from an operating system of a client in a network having at least one dump server, the client comprising system memory allocated according to system memory classifications, and the client being arranged to:
   save pre-crash dump data periodically to the at least one dump server during client system run-time prior to an event of a client system crash wherein said pre-crash dump data includes dump meta-data having size and system memory classification information of said pre-crash dump data; and
   save crash dump data to the at least one dump server in the event of the client system crash to at least complement the pre-crash dump data, wherein the crash dump data comprises modified portions of the pre-crash dump data.

14. A system as claimed in claim 13, wherein the crash dump data comprises pre-crash dump data modified in the client operating system.

15. A system as claimed in claim 13, wherein said system further includes a debugger configured to retrieve said dump meta-data from at least one dump server to determine a dump data location in the dump server to retrieve said pre-crash dump data.

16. A system as claimed in claim 15, wherein said client includes said debugger.

17. A method for saving pre-crash dump data and crash dump data from an operating system of at least one client in a network, comprising:
   configuring the client to allocate client system memory according to system memory classifications;
   configuring the client to transfer the pre-crash dump data and crash dump data to at least one dump server wherein said client is configurable to vary the frequency of the pre-crash dump data sent periodically during client system run-time;
   saving said pre-crash dump data periodically during client system run-time prior to an event of a client system crash, and based on the system memory classifications; and
   saving the crash dump data in the event of the client system crash to at least complement the pre-crash dump data, wherein the crash dump data comprises modified portions of the pre-crash dump data.

18. A method as claimed in claim 17, further comprising:
   determining whether said allocated client system memory has been modified since a last transfer of the pre-crash dump data; and
   transferring the pre-crash dump data modified since the last pre-crash dump data transfer to at least one dump server periodically and in the event of the client system crash.

19. A method as claimed in claim 17, further comprising configuring a debugger to retrieve the pre-crash dump data and the crash dump data from said dump server and to reassemble said pre-crash dump data and crash dump data into a client system data structure.

20. A non-transitory computer readable medium having computer readable instruction stored thereon which when executed by a client causes the client to carry out the method of claim 17.

* * * * *